United States Patent Office.

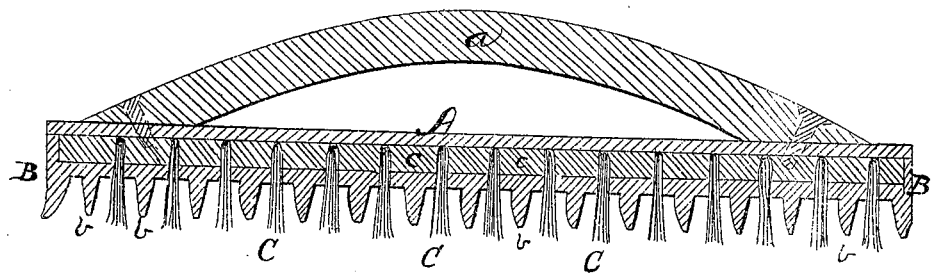
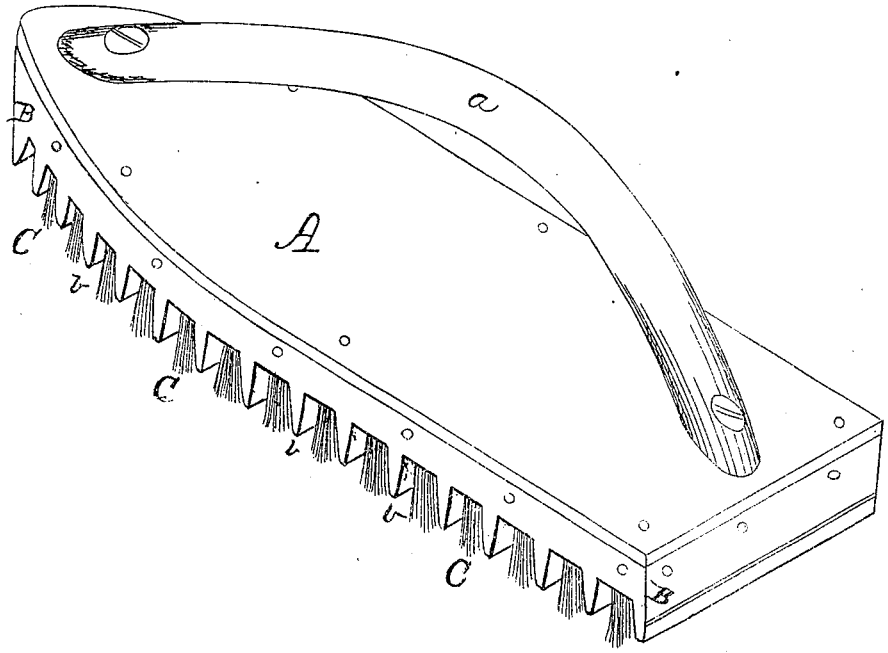

DANIEL E. HAYWARD, OF MALDEN, MASSACHUSETTS.

Letters Patent No. 75,421, dated March 10, 1868.

IMPROVED SCRUB-BRUSH.

The Schedule referred to in these Letters Patent and making part of the same.

Be it known that I, DANIEL E. HAYWARD, of Malden, and State of Massachusetts, have invented certain new and useful Improvements in Brushes, of which the following, with the drawings, is a full description.

Figure 1 is a perspective view, and

Figure 2 a sectional view of my brush, the face of which is composed of rubber projections and bristles.

A represents the wooden back, and $a$ the handle. B is the rubber portion, of which $b\ b$ are the projections or ridges. C C are the bristles, and $c\ c$ the wooden parts in which the bristles are fastened. The rubber portion is pressed, formed, and vulcanized in moulds in the usual manner in which what is called pressed work is made, the projections or ridges $b\ b$ running transversely across the brush. This portion, when made, is fastened to the wooden back by nails or pegs. Between the rubber projections or ridges the bristles are placed in rows or clusters, and fastened to the wooden back, as in other bristle brushes.

The rubber projections may take any desired form or direction, so long as they are interspersed with bristles.

Brushes, the faces of which are all rubber, have been made heretofore, as well as brushes the faces of which are all bristles, but the combination of the two, rubber and bristles, I believe to be new.

The rubber projections may be made separately, or in separate pieces, and fastened to the back, if desired.

What I claim, and desire to secure, is—

As an article of manufacture, the brush as described, viz, when composed of alternate rows of rubber and bristles.

In testimony whereof, I have hereunto subscribed my name.

D. E. HAYWARD.

Witnesses:
W. M. PARKER,
GEO. B. BLODGETTE.